United States Patent
Hund et al.

(10) Patent No.: US 9,725,532 B2
(45) Date of Patent: Aug. 8, 2017

(54) AQUEOUS SOLUTION OF CATIONIC COPOLYMERS DERIVED FROM ACRYLAMIDE, PREPARATION METHOD AND USE

(71) Applicant: S.P.C.M. SA, Andrezieux Boutheon (FR)

(72) Inventors: René Hund, Villars (FR); Christophe Auriant, Saint Etienne (FR); Laurent Mialon, Saint Galmier (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 15/104,018

(22) PCT Filed: Jan. 15, 2015

(86) PCT No.: PCT/FR2015/050100
§ 371 (c)(1),
(2) Date: Jun. 13, 2016

(87) PCT Pub. No.: WO2015/107302
PCT Pub. Date: Jul. 23, 2015

(65) Prior Publication Data
US 2016/0311940 A1    Oct. 27, 2016

(30) Foreign Application Priority Data

Jan. 15, 2014  (FR) .................................. 14 50301

(51) Int. Cl.
| | | |
|---|---|---|
| *D21H 21/06* | (2006.01) | |
| *C08F 8/44* | (2006.01) | |
| *C08F 8/00* | (2006.01) | |
| *D21H 17/45* | (2006.01) | |
| *D21H 21/10* | (2006.01) | |
| *D21H 21/18* | (2006.01) | |
| *C08L 39/00* | (2006.01) | |

(52) U.S. Cl.
CPC .................. *C08F 8/44* (2013.01); *C08F 8/00* (2013.01); *C08L 39/00* (2013.01); *D21H 17/455* (2013.01); *D21H 21/06* (2013.01); *D21H 21/10* (2013.01); *D21H 21/18* (2013.01); *C08F 2800/10* (2013.01); *C08L 2201/54* (2013.01)

(58) Field of Classification Search
CPC .......... C08F 8/44; C08L 39/00; D21H 21/06; D21H 21/10; D21H 21/18; D21H 17/45
USPC ....................................... 162/164
See application file for complete search history.

(56) References Cited

U.S. PATENT DOCUMENTS

| | | | |
|---|---|---|---|
| 3,619,358 A | 11/1971 | Yoshii et al. | |
| 8,404,083 B2* | 3/2013 | Haehnle | D21H 21/18 162/164.6 |
| 8,597,466 B2* | 12/2013 | Esser | D21H 17/42 162/164.5 |
| 8,623,966 B2* | 1/2014 | Hund | C08F 8/00 525/329.4 |
| 8,734,616 B2* | 5/2014 | Hund | C08F 8/00 162/164.6 |
| 9,303,359 B2* | 4/2016 | Hund | D21H 17/45 |
| 2004/0118540 A1 | 6/2004 | Garnier et al. | |

FOREIGN PATENT DOCUMENTS

| | | |
|---|---|---|
| CA | 2881868 | 2/2014 |
| EP | 0377313 A2 | 7/1990 |
| WO | 2006075115 A2 | 7/2006 |
| WO | 2008107620 A2 | 9/2008 |
| WO | 2009013423 A2 | 1/2009 |
| WO | 2010061082 A1 | 6/2010 |
| WO | 2011015783 A1 | 2/2011 |
| WO | 2014/029593 A1 | 2/2014 |

OTHER PUBLICATIONS

International Search Report for PCT/FR2015/050100 dated Jul. 1, 2015.

\* cited by examiner

*Primary Examiner* — Mark Halpern
(74) *Attorney, Agent, or Firm* — Heslin Rothenberg Farley & Mesiti P.C.

(57) ABSTRACT

The present invention relates to a process for the preparation of an aqueous polymer solution containing at least one cationic or amphoteric (co)polymer, comprising the following steps:
  Hofmann degradation reaction on a (co)polymer based on at least one non-ionic monomer chosen from the group including acrylamide, methacrylamide, N,N-dimethylacrylamide, and acrylonitrile;
  post-processing of the resulting aqueous polymer solution of viscosity V1;
  characterized in that the post processing comprises the following successive steps:
  obtaining of an aqueous polymer solution containing at least one cationic or amphoteric (co)polymer derived from the Hofmann degradation reaction;
  post-processing of this aqueous polymer solution;
  characterized in that the post processing comprises the following successive steps:
    (a) adjustment of the pH of the aqueous polymer solution to a value greater than or equal to 5.5;
    (b) decrease of the pH of the aqueous polymer solution to a value between 2 and 5.

The invention also concerns the use of this polymer solution as a flocculant, retention and/or drainage agent, and dry strength resistance in a paper manufacturing process.

20 Claims, No Drawings

AQUEOUS SOLUTION OF CATIONIC COPOLYMERS DERIVED FROM ACRYLAMIDE, PREPARATION METHOD AND USE

CROSS REFERENCE TO RELATED APPLICATIONS

This application is a national stage filing under section 371 of International Application No. PCT/FR2015/050100, filed on Jan. 15, 2015, and published on Jul. 23, 2015 as WO/2015/107302, and claims priority to French Application No. 1450301, filed on Jan. 15, 2014. The entire disclosures of each of the prior applications are hereby incorporated herein by reference.

The invention relates to an aqueous solution of cationic or amphoteric (co)polymers, obtained by Hofmann degradation performed on a (co)polymer base of at least one non-ionic monomer chosen from the group including acrylamide, methacrylamide, N,N-dimethylacrylamide, and acrylonitrile. The process for the preparation of this polymer solution is characterized in that it performs specific post-processing on the (co)polymer solution obtained following Hofmann degradation.

The invention also concerns the use of this (co)polymer solution as an additive in processes for manufacturing paper, cartons or similar, and more particularly as a flocculating, retention and/or drainage agent, and for dry strength resistance.

Hofmann Degradation

This reaction, discovered by Hofmann at the end of the nineteenth century, allows the conversion of an amide function to a primary amine function with one fewer carbon atom. The reaction mechanism is detailed below.

In the presence of a base (soda), one proton is pulled from the amide.

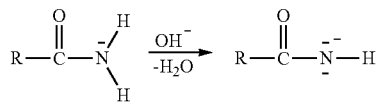

The amidate ion formed then reacts with the active chlorine (Cl$_2$) of the hypochlorite (e.g.: NaClO, which is in equilibrium: 2 NaOH+Cl$_2$ ⇔ NaClO+NaCl+H$_2$O) to give an N-chloramide. The base (NaOH) pulls one proton from the chloramide to form an anion. The anion loses an ion chloride to form a nitrene which undergoes transposition to an isocyanate.

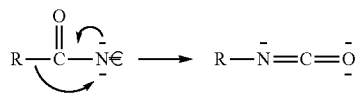

By means of a reaction between the hydroxide ion and the isocyanate, a carbamate is formed.

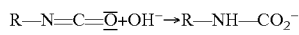

After decarboxylation (removal of CO$_2$) from the carbamate, a primary amine is obtained.

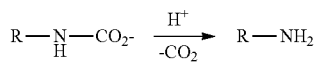

For the conversion of all or part of the amide functions of a (co-)polymer comprising an amide grouping to an amine function, 2 main factors are involved (expressed as molar ratios). These are:

Alpha=(hypohalite of earth alkaline and/or alkaline/amide group) and

Beta=(alkaline hydroxide and/or earth alkaline/hypohalite of alkaline and/or earth alkaline).

Although Hofmann degradation focuses initially on the amide groups, it may also cover the nitrile functions (—C≡N), and in particular those of acrylonitrile (co)polymers.

The polymers obtained by the Hofmann degradation reaction are also used in the paper manufacturing process. Generally speaking, the effectiveness of these polymers as agents of resistance increases with their cationicity. In other words, in order to increase their cationicity, the (co)polymers thus implemented exhibit a high degree of degradation. Indeed, depending on the Alpha degree of degradation, it is possible to generate variations of cationicity relating to the quantity of amine functions produced on the carbon skeleton of the (co)polymer. Furthermore, it is recognized that when the product obtained by the Hofmann degradation reaction is amphoteric, it can also be used to improve the retention of loads during the manufacturing process of paper or cardboard, while maintaining the dry strength resistance performance.

The cationicity of the degraded (co)polymer can come from formed amine groups that may be protonated, but also the potential presence of a cationic monomer.

Until recently, only very heavy processes that implement, in situ, a Hofmann degradation product manufacturing unit (EP 377313) or processes involving work with another polymer (base type N-vinylformamide (co)polymer followed by hydrolysis), itself relatively expensive, (US 2004/118540), had been implemented.

The first viable industrial solution was proposed in early 2005 in document WO2006075115 of the Applicant. In this document, the Hofmann degradation product described is an organic polymer product of a concentration greater than 3.5% by weight. Although the polymers described in this document can greatly improve the performance of dry strength resistance, they have a very low molecular weight, meaning that there is very little interest in these (co)polymers for applications such as drainage or flocculation.

The Applicant's documents WO2008/107620 and WO/2010/061082 allowed a partial solution of this problem of low performance in draining. However, the polymers described in these documents present a performance cap for drainage and retention.

The Applicant's document WO 2009/013423 helped to increase the performance of draining by proposing a (co)polymer-based post-processing step following the Hofmann reaction. This post-processing step is a post-ramification performed on the copolymer obtained by Hofmann degradation in the presence of at least one polyfunctional branching agent. However, this process had very strong boundaries with very complex post-ramification (delicate industrialization) control, and performances were also saturated for dosages greater than 1.5 kg active per tonne of paper.

The Applicant's document WO 2011/015783 proposes new polymers permitting the pushing of the limits of saturation in performance, especially for high dosages, in the order of 2 kg active/tonne.

The issue proposed to resolve the invention is therefore to develop polymers with draining properties which can be further improved compared to polymers of the prior art, without, however, causing loss of physical properties.

In addition, the present invention allows meeting, and even exceeding, the properties of the polymers of the prior art, with the same dosage or less.

DESCRIPTION OF THE INVENTION

The applicant has found and developed new water-soluble polymers with improved drainage properties, said polymers are obtainable by alkalinization followed by acidification of a cationic or amphoteric copolymer obtained by Hofmann degradation.

The applicant noted, in a surprising and unexpected way, that this conducted treatment allows a drainage performance improvement over the same untreated polymer to be conferred upon a cationic or amphoteric polymer obtained by Hofmann degradation.

In other words, the object of the invention is a process for the preparation of an aqueous polymer solution of viscosity V3 containing at least one cationic or amphoteric (co) polymer, comprising the following steps:
  so-called Hofmann degradation reaction, in aqueous solution, in the presence of an earth alkaline and/or alkaline hydroxide and an earth alkaline and/or alkaline hypohalite on a (co)polymer base of at least one non-ionic monomer chosen from the group including acrylamide, methacrylamide, N,N-dimethylacrylamide, and acrylonitrile;
  obtaining of an aqueous polymer solution containing at least one cationic or amphoteric (co)polymer derived from the Hofmann degradation reaction;
  post-processing of the resulting aqueous polymer solution of viscosity V1;
characterized in that the post processing comprises the following successive steps:
  (a) adjustment of the pH of the aqueous polymer solution to a value greater than or equal to 5.5;
  (b) lowering of the pH of the aqueous polymer solution to a value between 2 and 5.
  Preferably, in step a) of the process,
  Measurement of the V1 viscosity of aqueous polymer solution; then
  Adjustment of the pH of the aqueous polymer solution to a value greater than or equal to 5.5 and increase of V1 viscosity of the aqueous polymer solution up to a V2 value corresponding to at least 1.5 times the V1 value while being less than 100 000 mPa·s (100,000 cps).
  Preferably, in step b), adjustment of the pH to between 2 and 5, and decrease in the viscosity of the polymer solution aqueous to a V3 value, greater than V1 and less than V2.
  "Resulting aqueous polymeric solution" refers to the polymeric solution obtained at the end of the Hofmann degradation reaction. This solution includes the (co)polymers degraded by the Hofmann reaction.

In other words, the Hofmann degradation reaction is terminated before any post-processing is carried out according to the invention. A complete reaction means that the reaction has come to an end, in other words that all reactions which should take place under the conditions of the reaction have taken place. This does not necessarily mean that the reaction is complete. The reaction is either complete and full, or complete and partial. A reaction which is complete and full means that all amides functions have been transformed into amine functions, which corresponds to an alpha factor equal to 1. In this case, the post-processed aqueous polymer solution includes the totally degraded (co)polymer base. A complete and partial reaction means that at the end of the reaction, only a portion of the amide functions have been transformed into amine functions, and corresponds to an alpha factor of less than 1, referred to as partial alpha. In this case, the alpha factor is preferentially greater than 0.5 and strictly less than 1. In this case also, the post-processed aqueous polymer solution includes the partially degraded (co)polymer base.

In addition, and according to a particular embodiment, the resulting aqueous polymeric solution may be concentrated or diluted prior to post-processing steps.

Hofmann degradation may be carried out on at least one (co)polymer base.

In general, viscosity is expressed in centipoises (cps cP) or millipascal seconds (mPa·s), 1 cP being equal to 1 mPa·s.

Viscosities are measured with a Brookfield viscometer, at 25° C. with an LV module.

In the present application, it is considered that practitioners are able to determine the module and speed (Brookfield viscometer, LV module) adapted according to the range of viscosity to measure. Such measures in effect form part of the general knowledge of the skilled person.

The module of the viscometer is adapted according to the measured viscosity, this step forms part of routine operations faced by the skilled person when they want to measure the viscosity of a solution. The indicative table below specifies which module to use depending on the viscosity of the solution at 25° C.:

| LV Module | LV1 | LV1 | LV2 | LV2 | | |
|---|---|---|---|---|---|---|
| Viscosity (mPa·s) | 0-100 | 0-200 | 100-400 | 200-800 | | |
| Module speed (rpm) | 60 | 30 | 60 | 30 | | |
| LV Module | LV3 | LV3 | LV3 | LV4 | LV4 | LV4 |
| Viscosity (mPa·s) | 400-1600 | 600-3200 | 2K-8K | 2K-8K | 4K-20K | 20K-200K |
| Module speed (rpm) | 60 | 30 | 12 | 60 | 30 | 12 |

These data are consistent with a DIAL READING VISCOMETER equipped with LV module

1 K=1000

1 rpm=1 round per minute

By way of indication a LV-3 module is particularly suitable for measuring viscosity of 5,000 mPa·s, including a speed of 12 rpm and a temperature of 25° C. These conditions are particularly suitable for a concentration based polymer following the Hofmann degradation reaction in the order of 7% by weight, in relation to the weight of the aqueous solution implemented.

Whatever the case, the polymer concentration resulting from the Hofmann degradation reaction is not determinative for measuring viscosity. Indeed, this concentration varies during the process due to the stages of pH adjustment. The measurement of the viscosity of the polymer solution does not require a fixed polymer concentration.

As already mentioned, in step a) post-processing, the pH of the polymeric solution is adjusted to a value greater than or equal to 5.5. According a particular realization, the pH is preferably between 5.5 and 12, and most preferably between 5.5 and 10, and even more preferably between 5.5 and 8.

In relation to V2 viscosity, this should be less than 100 000 mPa·s (100,000 cps), preferably less than 50 000 mPa·s (50,000 cps), and ideally less than 30 000 mPa·s (30,000 cps). Furthermore the V2 viscosity should ideally be greater than or equal to 2 times the V1 viscosity. V2 viscosity should preferably be more than 2000 mPa·s, ideally more than 3000 mPa·s.

In step b) post-processing, the pH of the polymeric solution is lowered to a value between 2 and 5, preferably between 2 and 4, and ideally between 3 and 4.

Post-processing according to the invention should preferably be carried out on the polymeric aqueous solution directly obtained at the end of the Hofmann degradation. As already indicated, the polymeric solution obtained at the end of the Hofmann degradation can also be diluted or concentrated before post-processing according to the invention is carried out.

The concentration of aqueous polymer solution on which post-processing according to the invention is carried out preferably lies between 0.5% and 50% by weight of (co)polymer (totally or partially degraded from Hofmann degradation) compared to the weight of said polymer solution, preferably between 2 and 30% and ideally between 7 and 20%. This is the (co)polymer concentration from the Hofmann degradation of a (co)polymer base, prior to post-processing.

The V1 viscosity of the polymeric solution on which post-processing according to the invention is carried out is preferably between 10 mPa·s (10 cps) and 5000 mPa·s (5000 cps) (Brookfield 25° C. and LV1 module), and preferably between 50 and 500 mPa·s (50 to 500 cps).

According to a particular embodiment, post-processing according to the invention is carried out on a polymeric solution containing as polymers only those produced directly by the Hofmann degradation. In other words, and according to this particular mode of implementation, the post-processed polymeric aqueous solution contains only (co)polymers from the Hofmann degradation of a (co)polymer base as described above.

According to another embodiment, the process according to the invention is implementing at least two base (co)polymers. In this case, the post-processed aqueous polymer solution includes (co)polymers from the Hofmann degradation of the two base (co)polymers.

The post-processing steps are usually carried out at a temperature of between 5 and 50° C., preferably between 10 and 30° C.

Generally the pH of the polymeric solution directly obtained at the end of the Hofmann degradation is between 2 and 5, and more generally between 3 and 4. This corresponds to the pH range in which a (co)polymer from a so-called Hofmann degradation presents performance stability over time. In general, the adjustment of the pH in step a) of the process is to increase the pH to a value greater than or equal to 5.5.

Post-processing according to the invention is performed on a polymeric solution preferably with a pH of between 2 and 5, more preferably between 2.5 and 4.5, and ideally between 3 and 4.

The Applicant noted that the adjustment of the pH to a value greater than or equal to 5.5 with a polymeric aqueous solution containing a cationic or amphoteric (co)polymer obtained by Hofmann degradation reaction led to a gradual increase of the viscosity thereof, this increase in viscosity can be interrupted at any time by returning to the initial pH.

This increase in viscosity allows, in a surprising and unexpected way, the conferring upon the final cationic or amphoteric polymer of drainage performance properties which are significantly improved compared to the same polymers which have not undergone post-processing, i.e. in relation to Hofmann polymers of previous methods.

Without being bound by any theory, the Applicant believes that this increase in viscosity may be related to an increase in molecular weight and/or a branching reaction. In this case, and contrary to previous methods, this branching was not linked to the addition of a polyfunctional compound.

The first step of post-processing according to the invention is to adjust the pH of a polymeric solution containing the polymers obtained at the end of said Hofmann degradation, to a pH greater than or equal to 5.5, preferably between 5.5 and 12, allowing the increase in viscosity of said solution. For this purpose any base or basic product may be used. This includes for example alkali hydroxides like soda, the earth alkali hydroxides like calcium hydroxide, or other bases such as ammonia, and quicklime. Preferably, sodium hydroxide should be used, preferentially diluted in an aqueous solution with a concentration of generally less than 10 mol/liter.

Adjustment of the pH by adding base may be performed once or several times, in continuous casting or complete and rapid addition. The base quantity and how to incorporate the base will be easily determined by experienced practitioners so as to adjust the pH of the solution to the desired pH. The addition should preferably be performed under mechanical agitation of the aqueous polymeric solution.

The speed of this increase in viscosity depends greatly on the pH, with an acceleration of kinetics when the pH is between 7 and 9, or between 8 and 9. Beyond pH=10, kinetics tend to decrease.

This step in post-processing according to the invention is also to allow the mix to react for a time known as maturation, so that the V2 viscosity of the aqueous polymer solution increases by at least 50% compared to V1, preferably by at least 100%, and that the viscosity of the polymer solution is not too high.

Indeed, a V2 viscosity which is too high could result in a difficulty to handle the solution and perform the following step of acidification. This is the reason why the maximum V2 viscosity is less than 100,000 cps, preferably less than 50,000 cps, and ideally less than 30,000 cps.

During this step, the increase in V2 viscosity can be controlled with regular measurements of viscosity using a Brookfield viscometer at 25° C.

The amount of time required to reach the V2 viscosity may vary according to different parameters. It is preferably between 5 minutes and 100 hours, and ideally between 30 minutes and 10 hours.

As for any chemical reaction, various factors may be changed in order to speed up or slow down the kinetics of assuming viscosity, such as, for example, temperature, dilution of the mixture, the incorporation of salts, etc. . . .

During this step of increasing V1 viscosity to the V2 value, the mixture should preferably be under mechanical agitation.

The second stage of post-processing is at the end of having obtained the V2 viscosity, in order to lower the pH of the polymeric solution to a pH of between 2 and 5, preferably less than 4 and ideally between 3 and 4.

This step helps stop unknown reactions which occur when adding to a copolymer base and as reflected in the rise in viscosity. Without being linked to any theory, this could be a trans-amidation.

As already stated, the final V3 viscosity of the polymeric solution obtained at the end of the second stage of post-processing should ideally be greater than V1 and less than V2. It should ideally be greater than 150 mPa·s (150 cps) (Brookfield 25° C.) when the (co)polymer concentration is 8% by weight compared to the weight of the solution. It should ideally be greater than 200 mPa·s (200 cps) (Brookfield 25° C.).

To implement step b), any acid or acid product may be used. Examples are, but not limited to, hydrochloric acid, sulfuric acid and nitric acid. Acid should ideally be added in the form of an aqueous acid solution.

The lowering of the pH by adding acid may be done once or several times, by a continuous flow or complete and rapid addition. The acid quantity and how to incorporate the acid will be easily determined by experienced practitioners so as to adjust the pH of the solution to the desired pH. Addition should preferably be performed under agitation.

The cationic or amphoteric (co)polymer derived from the acrylamide on which post-processing is carried out according to the invention This is obtained by Hofmann degradation reaction on a (co)polymer base.

The (co)polymer 'base'

In practice, the (co)polymer base is prepared before the Hofmann degradation. The (co)polymer base used contains:
  at least 5 moles % of at least one non-ionic monomer selected from the group consisting of acrylamide, methacrylamide, N,N-dimethylacrylamide, and acrylonitrile, preferably acrylamide,
  optionally up to 95 mole % of at least:
    one cationic ethylene non saturated monomer, preferably selected from the group consisting of monomers of type dialkylaminoalkyl (meth) acrylamide, diallylamine, methyldiallylamine, and their quaternary ammonium salts, in particular including dimethyldiallylammonium chloride (DADMAC), acrylamidopropyltrimethylammonium chloride (APTAC) and/or methacrylamidopropyltrimethylammonium chloride (MAPTAC),
    or at least one non-ionic monomer preferentially selected from the group consisting of N-vinyl acetamide, N-vinyl formamide, N-vinylpyrrolidone and/or vinyl acetate,
    or at least one anionic type acid or anhydride monomer selected from the group consisting of (meth)acrylic acid, acrylamidomethylpropyl sulfonic acid, itaconic acid, maleic anhydride, maleic acid, methallyl sulfonic acid, vinylsulfonique acid, and their salts,
    or at least one additional polyfunctional compound selected from the group including polyethylenimine, polyamine (primary or secondary), polyallylamine, functional thioether, polyols, epichlorohydrin polyamides (PAE), and polyamine amides (AAP), preferably polyethylenimine.

In association with these monomers, it is also possible to use monomers which are insoluble in water, such as acrylic, allyl or vinyl monomers having a hydrophobic grouping. When using them, these monomers will be used in very low quantities, less than 10 mole %, preferably less than 5 mole %, or less than 1% and they will be selected preferably from the group which includes derivatives of acrylamide such as N-alkylacrylamides for example N-tert-butylacrylamide, octylacrylamide and N, N-dialkylacrylamides such as N, N-dihexylacrylamide, acrylic acid derivatives such as alkyl acrylates and methacrylates.

According to a preferred characteristic of the invention, the (co)polymer base may be branched.

According to one preferred embodiment of the invention, the copolymer base should be a cationic copolymer. Preferably it should contain at least 5 mole % of cationic monomers.

The branching of the (co)polymer base can be carried out preferably during (or possibly after) the polymerization of monomers of the (co)polymer "base", in the presence of at least one polyfunctional branching agent and possibly at least a transfer agent. Below is a non-exhaustive list of ramifiants: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glycidylether type compounds such as ethylene glycol glycidyl ether, or epoxy or other means well known to the person skilled in the art.

In practice, the branching agent should preferably be introduced at the rate of five to fifty thousand (5 to 50000) parts per million by weight with respect to the active substance, preferably 5 to 10000, ideally from 5 to 5000. Preferably, the branching agent should be methylene bis acrylamide (MBA).

At least one transfer agent may also be used in the synthesis of the polymer base. Below is a non-exhaustive list of transfer agents: isopropyl alcohol, sodium hypophosphite, and mercaptoethanol.

A person skilled in the art will know how to choose the best combination based on their own knowledge of this description, as well as examples below.

The (co)polymer serving as the base of the Hofmann degradation reaction does not require a particular polymerization development process. The main polymerization techniques, well known by the person skilled in the art and which be used include: polymerization by precipitation, polymerization in emulsion (aqueous or reverse) followed or not by a step of distillation and/or spray drying, polymerization in suspension or polymerization in solution, these last two techniques being preferred.

It is also possible to add to the (co)polymer base solution, before or during the Hofmann degradation reaction, some additives which are liable to react to the isocyanate polymer functions, functions that are generated during degradation depending on the reaction scheme described above. In general, these are molecules with nucleophilic chemical functions such as hydroxyl functions, amino. . . . As examples, the additives in question can therefore be: alcohols, polyols (e.g. starch), polyamines, polyethylene imines. . . .

According to an another specific embodiment, the (co)polymer base contains in its midst (in addition to the monomers) at least one polyfunctional compound containing at least 3 heteroatoms selected from N, S, O, P and each with at least one mobile hydrogen.

In practice, the multifunctional compound is added before or during the polymerization of the (co)polymer base. It can also be grafted onto the (co)polymer base prior to the Hofmann reaction. The incorporation of the polyfunctional compound should preferably be carried out as mentioned in document WO 2011/015783.

This polyfunctional compound should preferably be selected from the group consisting of polyethylenimine, polyamine (primary or secondary), polyallylamine, thioether functional polyols, polyamides epichloridrine and polyamine amides.

It should preferably be polyethylenimine or polyamine amides.

According to this specific embodiment, the (co)polymer base contains at least 100 ppm of a polyfunctional compound. The (co)polymer base should preferably contain up to 10% by weight of a polyfunctional compound.

The incorporation of versatile cationic ion salts, as mentioned in the Applicant's patent request WO 2010/061082, can also be made in order to increase the stability of products with an Alpha coefficient of less than 1.

Hofmann Degradation Reaction on the Copolymer 'Base'

The Hofmann reaction requires the conversion of the amide (and where appropriate nitrile) functionality to an amino function involving 2 main factors (expressed as molar ratios):

Alpha=(hypochlorite of alkaline and/or earth alkaline/ amide group)

Beta=(alkaline hydroxide and/or earth alkaline/hypochlorite of alkaline and/or earth alkaline).

From a (co)polymer 'base' solution previously described, with a concentration of between 5 and 40% by weight, preferably between 20% and 30%, the total molar acrylamide function quantity is determined. The level of desired Alpha degradation is then chosen (which corresponds to the degree of desired amino function i.e. number of amide/nitrile functions converted into amine functions), which allows the determination of the dry quantity of hypohalite of alkaline and/or earth alkaline and then the beta coefficient, which is used to determine the dry of alkaline and/or earth alkaline hydroxide.

An alkali or earth alkaline hypohalite and hydroxide solution is then prepared from alpha and beta reports. According to the invention, the reagents to preferably be used are sodium hypochlorite (bleach water) and lye (sodium hydroxide).

The non-ionic hypohalite/monomer Alpha coefficient used for the preparation of polymers should preferably be greater than 0.1, or 0.3, preferably greater than 0.5 and ideally less than 1.

In order to stabilize the amino functions that are produced, in the reactor containing the (co)polymer base, one (or possibly more) derivative of quaternary ammonium compounds may be added described in document JP 57077398. This has an effect that is intended to prevent the reaction between the residual amine and amide functions. It should be noted, moreover, that the addition of these agents may be performed separately, simultaneously, mixed or not, in any order of introduction, and at one or more injection sites.

The increase in canonicity of the (co)polymer base occurs during Hofmann degradation, by the complete or partial use/consumption of a hypohalite of alkali or earth alkaline.

In addition, it is also possible to use (co)cationic or amphoteric acrylamide polymers of the invention obtained by Hofmann degradation reaction, in the form of a mixture with one or more other polymer(s), synthetic or natural.

The polymers obtained after post processing according to the invention.

The polymeric solution according to the invention should ideally present a V3 viscosity (Brookfield 25° C.) which is greater than 150 mPa·s (150 cps), when the (co)polymer concentration is 8% by weight compared to the weight of the solution. It should preferably be greater than 200 mPa·s (200 cps). It should be greater than the initial viscosity V1.

The polymers of the invention have a cationic charge density that is preferably greater than 2 meq/g, and ideally greater than 5 meq/g.

Similarly, although prepared in solution, the polymers of the invention may also be offered in solid form. In these conditions, the solid form contains not only the (co)polymer, but also a proportion of salt that is obtained at the end of the Hofmann degradation reaction. In practice, they are obtained among others by processes consisting of drying the previously mentioned solution. The main isolation techniques used are those of drying by atomization or spraying (which is in order to create a cloud of droplets in a hot gas stream for a controlled length of time), using a drying drum, fluidized bed dryers. . . .

The aqueous polymer solution the invention may be used successfully for the manufacture of paper and cardboard packaging, paper supports, for any type of paper, cardboard or the like requiring the use of a cationic polymer as a clotting and/or retention agent and/or promoter of cationic charge.

The polymers of the invention provide a significant improvement in drainage performance over the same untreated polymers, compared to Hofmann Polymers of the previous method.

They allow, in particular, a significant gain in the productivity of paper machines notably by means of obtaining good drainage properties and resistance to bursting and extremely high traction.

The present invention also concerns the use of an aqueous polymer solution according to the invention as a flocculant, retention and/or drainage agent, and dry strength resistance in a paper manufacturing process.

Due to their intrinsic properties (stabilization, cationization, complexation . . . ), the polymers of the invention may also be of interest in various applications, including without limitation: water treatment (drinking or waste), techniques of coagulation/flocculation, the mining industry, cosmetics industry, detergents industry, and textile industry.

The invention and resulting benefits will become clear from the following usage examples.

EXAMPLES

Cationic Co-Polymers Derived from the Acrylamide Polymer A:

A cationic polymer A is obtained by Hofmann degradation reaction on a copolymer base (20% active ingredient) of acrylamide (70 mole %) and branched dimethyldiallyl ammonium chloride (DADMAC) (30 mole %) (MBA: 600 ppm by weight/active ingredient) modified with polyamine-amide polymer (of type Retaminol K1 Kemira), to 2.5% by weight of the active ingredient.

To do this, the polyamineamide is mixed with the DADMAC polymer and MBA in the reactor.

The acrylamide is embedded in continuous casting for 2 hours, in a reaction medium maintained at 85° C. Catalysis is by SPS sodium metabisulfite and metabisulphite (MBS), well-known catalysts to the person skilled in the art.

The resulting polymer base has a viscosity of 5500 mPa·s (5500 cps) (LV3, 12 rpm).

Hofmann degradation in itself takes place in the same way as in example 1 of the Applicant's document WO/2010/061082.

A calcium salt in the form of calcium chloride ($CaCl_2$) is dissolved in the copolymer base solution, to 2% by weight compared to the copolymer base.

The Hofmann degradation reaction is performed on the prepared solution at a temperature of 25° C. using sodium hydroxide and sodium hypochlorite in proportions necessary to obtain a partial alpha (0.7).

The intermediate product is then decarboxylated in an excess of hydrochloric acid, and then the pH is adjusted by the addition of soda (pH in the range of 3 to 4).

The cationic copolymer derived from the acrylamide presents a V1 viscosity of 72 mPa·s (72 cps) (25° C., Brookfield LV1, 60 rpm) and a concentration of 8.5%.

Polymer B:

A cationic polymer B is obtained by Hofmann degradation reaction on copolymer base (20% active ingredient) of acrylamide (70 mole %) and branched dimethyldiallyl ammonium chloride (DADMAC) (30 mole %) (MBA: 1000 ppm by weight/active ingredient) modified with polyamineamide polymer (of type Retaminol K1 Kemira), to 2.5% in relation to the weight of the active ingredient.

To do this, the polyamineamide is mixed with the DADMAC polymer and MBA in the reactor.

The acrylamide is embedded in a continuous flow for 3 hours, in a reaction medium maintained at 85° C. Catalysis is by SPS sodium metabisulfite and metabisulphite (MBS), well-known catalysts to the person skilled in the art.

The resulting polymer base has a viscosity of 8000 mPa·s (8000 cps) (LV3, 12 rpm).

Hofmann degradation in itself takes place in the same way as in example 1 of the Applicant's document WO/2010/061082.

A calcium salt in the form of calcium chloride ($CaCl_2$) is dissolved in the copolymer base solution, to 2% by weight compared to the weight of the copolymer base.

The Hofmann degradation reaction is performed on the prepared solution at a temperature of 25° C. using sodium hydroxide and sodium hypochlorite in proportions necessary to obtain a partial alpha (0.85).

The intermediate product is then decarboxylated in an excess of hydrochloric acid, and then the pH adjusted by the addition of soda (pH in the range of 3 to 4).

The cationic copolymer derived from the acrylamide presents a V1 viscosity of 60 mPa·s (60 cps) (25° C., Brookfield LV1, 60 rpm) and a concentration of 8.0%.

Post Processing 1 (Counter-Example):

Post processing 1 takes place according to the method developed in the Applicant's document WO 2009/013423: the polymer A is thus post branched by an addition of 1% by weight/active ingredient of polyethylene glycol triepoxyde (GrilBond G 1701). The cationic copolymer derived from the acrylamide presents a V1 viscosity of 324 mPa·s (324 cps) (25° C., Brookfield LV2, 60 rpm) and a concentration of 8.0%.

Post Processing 2 (Invention):

Post-Processing 2.1

Polymer A, cooled to 15° C., is post treated by adjusting the pH=9, by adding an aqueous solution of soda diluted to 30% by weight, in agitation. A maturation period of 1 hour is observed, again at 15° C. The V2 viscosity reaches 1300 mPa·s (1300 cps) (25° C., Brookfield LV3, 60 rpm). The pH is then lowered to pH=3 by the addition of 30% hydrochloric acid. The aqueous cationic copolymer solution derived from the acrylamide presents a V3 viscosity of 938 mPa·s (938 cps) (25° C., Brookfield LV3, 60 rpm) and a concentration of 8.0%.

Post Processing 2.2

Polymer A, cooled to 15° C., is post treated by adjusting the pH=9, by adding an aqueous solution of soda diluted to 30% by weight, in agitation. A maturation period of 1 hour is observed, again at 15° C. The V2 viscosity reaches 12500 mPa·s (12500 cps) (25° C., Brookfield LV3, 12 rpm). The pH is then lowered to pH=3 by the addition of 30% hydrochloric acid. The aqueous cationic copolymer solution derived from the acrylamide presents a V3 viscosity of 6000 mPa·s (6000 cps) (25° C., Brookfield LV3, 12 rpm) and a concentration of 8.0%.

Post Processing 2.3

The B polymer, cooled to 15° C., is treated post in the alkalizing pH=8, by adding an aqueous solution of soda diluted to 30% by weight, stirring. A maturation period of 2 hours is observed, again at 15° C. The V2 viscosity reaches 4700 mPa·s (4700 cps) (25° C., Brookfield LV3, 12 rpm). The pH is then lowered to pH=3 by the addition of 30% hydrochloric acid. The aqueous cationic copolymer solution derived from the acrylamide presents a V3 viscosity of 1600 mPa·s (1600 cps) (25° C., Brookfield LV3, 30 rpm) and a concentration of 7.5%.

Post Processing 3 (Counter-Example):

Polymer A, cooled to 15° C., is post treated by adjusting the pH=6, by adding an solution of soda diluted to 30% by weight, in agitation. A maturation period of 10 minutes is observed, again at 15° C. The V2 viscosity reaches 94 mPa·s (94 cps) (25° C., Brookfield LV1, 30 rpm). The pH is then lowered to pH=3 by the addition of 30% hydrochloric acid. The aqueous cationic copolymer solution derived from the acrylamide presents a V3 viscosity of 86 mPa·s (86 cps) (25° C., Brookfield LV1, 60 rpm) and a concentration of 8.0%.

Drainage Performance Test of Polymers from the Hofmann Reaction

CSF Test

CSF sequence at 1000 rpm (revolutions per minute):

Use a static form for agitation of the mixture. Introduction of 1 liter of paste at 0.3%.

T=0 s: agitation of the mixture

T=10 s: addition of the polymer

T=30 s: stopping the agitation and recovery of the liter of paste. Performance of the TAPPI T2270M-94 test.

Performance compared to prior art polymers:

TABLE 1

Performance of CSF draining at 1 kg/ton

| Polymer | Cationic Dosage (kg/tonne) | CSF Value (ml) | % Improvement in CSF |
|---|---|---|---|
| White | 0 | 293 | 0 |
| Polymer A | 1 | 357 | 22 |
| Polymer B | 1 | 347 | 18 |
| Post processing 1 | 1 | 366 | 25 |
| Post processing 2.1 | 1 | 387 | 32 |
| Post processing 2.2 | 1 | 395 | 35 |
| Post processing 2.3 | 1 | 399 | 36 |
| Post processing 3 | 1 | 337 | 23 |

TABLE 2

Performance of CSF draining at 1.3 kg/ton

| Polymer | Cationic Dosage (kg/tonne) | CSF Value (ml) | % Improvement in CSF |
|---|---|---|---|
| White | 0 | 296 | 0 |
| Polymer A | 1.3 | 385 | 30 |
| Polymer B | 1.3 | 380 | 28 |
| Post processing 1 | 1.3 | 397 | 34 |
| Post processing 2.1 | 1.3 | 420 | 42 |
| Post processing 2.2 | 1.3 | 430 | 45 |
| Post processing 2.3 | 1.3 | 427 | 44 |
| Post processing 3 | 1.3 | 388 | 31 |

TABLE 3

Performance of draining at 1.5 kg/ton

| Polymer | Cationic Dosage (kg/tonne) | CSF Value (ml) | % Improvement in CSF |
|---|---|---|---|
| White | 0 | 295 | 0 |
| Polymer A | 1.5 | 410 | 39 |
| Polymer B | 1.5 | 408 | 38 |
| Post processing 1 | 1.5 | 428 | 45 |
| Post processing 2.1 | 1.5 | 448 | 52 |
| Post processing 2.2 | 1.5 | 460 | 56 |
| Post processing 2.3 | 1.5 | 465 | 58 |
| Post processing 3 | 1.5 | 413 | 40 |

CSF: measurement of the degree of "drainability" of the mixture
CSF: Canadian Standard Freeness For each of these analyses, the highest values correspond to the best performance.

Post-processed polymers, according to post-processing of the invention, have the best drainage performance in any dosage compared to prior art polymers.

In addition, the 2.1 post-processed polymer allows performances close to that of polymer A, but by implementing a lower polymer dosage. The performances of polymer A at 1.3 kg/t were reached with a dosage of 1 kg/ton of post-processed 2.1 polymer. In addition, the performances of polymer A at 1.5 kg/t were reached with a dosage of 1.3 kg/ton of post-processed 2.1 polymer.

These reductions in dosage, for equivalent performances, allow the end client to be offered less expensive systems, and thus to reach a market that the price of the prior technology would dissuade.

The polymeric solution from post processing 3, for which the V2 viscosity is only above 30% (1.3 times) the V1 viscosity, does not allow for a significant improvement in performance.

DDA Test

The DDA (Dynamic drainage analyzer) allows the determination of the time needed to completely drain a fibrous suspension. The polymer is added to the wet mixture within the cylinder of the DDA.

DDA Sequence at 1000 rpm (revolutions per minute):

Introduction of 0.6 liters of paste at 1.0%.

T=0 s: agitation of the mixture

T=10 s: addition of the polymer

T=30 s: stopping the agitation and draining to 200 mBar over 70 s

TABLE 4

Drainage performance at 1 kg/t and 1.5 kg/t.

| Example | V1 | V2 | V3 | % DDA Drainage Improvement 1 kg/T | % DDA Drainage Improvement 1.5 kg/T |
|---|---|---|---|---|---|
| Polymer A | 72 | NA | NA | 32 | 44 |
| Polymer B | 60 | NA | NA | 30 | 43 |
| Post processing 1 | 324 | NA | NA | 35 | 45 |
| Post processing 2.1 | 72 | 3500 | 938 | 41 | 52 |
| Post processing 2.2 | 72 | 12500 | 6000 | 43 | 52 |
| Post processing 2.3 | 60 | 4700 | 1600 | 47 | 55 |
| Post processing 3 | 72 | 94 | 86 | 33 | 43 |

NA: Not Applicable

Polymers post-processed according to the invention result in a drainage performance which is significantly better than non-post-processed polymers and polymers post treated in conditions outside of those defined by the invention.

Evaluation of Dry Strength Resistance

Paper forms are executed with an automatic dynamic former.

The "slurry" of mixture is made by the disintegration of dry pulp in order to obtain a final concentration of 3%.

The necessary amount of paste is taken in order to obtain a sheet with a weight of 60 g/m$^2$.

The concentrated paste is introduced into the dynamic sheet tank wherein it is agitated. Into this mixture are injected, in various tests, A polymers, post-processed 1, post-processed 2, as well as Xelorex BASF RS1200, a current reference in terms of DSR agent (Dry Strength Resistance, dry strength resistance). This paste is then diluted to a concentration of 0.32%.

In manual mode, the paste is pumped up to the level of the nozzle in order to prime the circuit.

Blotting paper and canvas are placed into the dynamic sheet bowl before starting the rotation of the bowl at 900 m/min and building the wall of water. The polymer will be injected 10 seconds before the start of the cycle for producing the sheet. The sheet is then produced (in automatic mode) by 22 round passes of the nozzle which throws the mixture onto the wall of water. Once the water is drained and the automatic sequence is complete, the formation with the network of fibers is removed from the dynamic sheet bowl and placed on a table. A dry blotter is deposited on the wet fiber side and is pressed once with a roller. All is returned and the canvas is carefully separated from the fibrous mat. A second dry blotting step is performed and the sheet (between two blotters) is pressed once in a press delivering 4 bar and then it is dried on a stretched dryer for 9 min at 117° C. The two blotters are then removed and the sheet is stored overnight in a room with controlled temperature and humidity (50% relative humidity and 23° C.). The dry strength properties of all of the sheets obtained by this procedure are then evaluated.

Burst (Burst index) is measured with a Messmer Büchel M 405 burst strength tester (average over 14 measures).

Dry traction is measured in the direction of the machine with a Testometric AX traction device (average over 5 samples).

The tests are performed with a neutral pH mixture composed of 100% recycled packaging.

Results obtained:

TABLE 5

Dry strength resistance performance at 1.5 kg/tonne

| Polymer | Polymer dosage | Burst Burst Index | Breaking length (km) |
|---|---|---|---|
| — | — | 2.50 | 4.89 |
| Polymer A | 1.5 kg/t | 3.20 | 6.10 |
| Polymer B | 1.5 kg/t | 3.25 | 6.13 |
| Post processing 1 | 1.5 kg/t | 3.19 | 5.99 |
| Post processing 2.1 | 1.5 kg/t | 3.24 | 6.14 |
| Post processing 2.2 | 1.5 kg/t | 3.2 | 6.08 |
| Post processing 2.3 | 1.5 kg/t | 3.18 | 6.1 |
| Post processing 3 | 1.5 kg/t | 3.20 | 6.09 |
| Xelorex RS1200 | 1.5 kg/t | 3.22 | 6.15 |

We observe that in addition to the draining performance, polymers post-processed according to the invention present dry resistance performance at least equivalent to prior art technologies.

The invention claimed is:

1. A process for the preparation of an aqueous polymer solution containing at least one cationic or amphoteric (co)polymer, said process comprising the following steps:
   performing Hofmann degradation reaction, in aqueous solution, in the presence of an earth alkaline and/or alkaline hydroxide and an earth alkaline and/or alkaline hypohalite on a (co)polymer base of at least one non-ionic monomer chosen from the group consisting of acrylamide, methacrylamide, N,N-dimethylacrylamide, and acrylonitrile;
   obtaining an aqueous polymer solution of V1 viscosity containing at least one cationic or amphoteric (co)polymer derived from the Hofmann degradation reaction; and
   post-processing of the aqueous polymer solution;
   wherein the post processing comprises the following successive steps:
      (a) adjusting the pH of the aqueous polymer solution to a value greater than or equal to 5.5; and
      (b) lowering the pH of the aqueous polymer solution to a value between 2 and 5.

2. The method according to claim 1, wherein the adjusting step (a) comprises:
   measuring the V1 viscosity of the aqueous polymer solution; then
   adjusting the pH to a value greater than or equal to 5.5 and increasing the V1 viscosity of the aqueous polymer solution up to a V2 value corresponding to at least 1.5 times the V1 value while being less than 100,000 mPa·s.

3. The method according to claim 2, wherein the V2 viscosity is greater than or equal to 2 times the V1 viscosity.

4. The method according to claim 3, wherein the V2 viscosity of the aqueous polymer solution is less than 50,000 mPa·s.

5. The method according to claim 4, wherein, in lowering step (b), the pH is lowered to a value of between 3 and 4.

6. The method according to claim 5, wherein the pH of the aqueous polymer solution on which the post-processing is carried is between 2 and 5 prior to post-processing.

7. The method according to claim 5, wherein the concentration of the aqueous polymer solution on which post processing is carried out varies between 0.5% and 50% by weight of (co)polymer compared to the weight of the aqueous polymer solution.

8. The method according to claim 7, wherein, following said post-processing, (co)polymers in the polymeric solution consist of (co)polymers that are solely and directly from the Hofmann degradation of a (co)polymer base.

9. The method according to claim 2, wherein the V2 viscosity of the aqueous polymer solution is less than 50,000 mPa·s.

10. The method according to claim 2, wherein, in step (b), the pH of the aqueous polymer solution is lowered to between 2 and 5, and its viscosity decreased to a value V3, greater than V1 and less than V2.

11. The method according to claim 1, wherein, in lowering step (b), the pH is lowered to a value of between 3 and 4.

12. The method according to claim 11, wherein the pH of the aqueous polymer solution on which the post-processing is carried is between 2 and 5 prior to post-processing.

13. The method according to claim 1, wherein the concentration of the aqueous polymer solution on which post processing is carried out varies between 0.5% and 50% by weight of (co)polymer compared to the weight of the aqueous polymer solution.

14. The method according to claim 1, wherein, following said post-processing, (co)polymers in the polymeric solution consist of (co)polymers that are solely and directly from the Hofmann degradation of a (co)polymer base.

15. The method according to claim 1, wherein, in step (a), the pH is adjusted by the addition of at least one compound selected from the group consisting of alkali hydroxides, earth alkaline hydroxides, ammonia, and quicklime.

16. The method according to claim 1, wherein, in step (b), the pH is lowered by the addition of at least one compound selected from the group consisting of hydrochloric acid, sulfuric acid and nitric acid.

17. The method according to claim 1, wherein the (co)polymer base used contains:
   a. at least 5 mole % of at least one non-ionic monomer selected from the group consisting of acrylamide, methacrylamide, N,N-dimethylacrylamide, and acrylonitrile,
   optionally up to 95 mole % of at least:
   b. a cationic non saturated ethylene monomer, selected from the group consisting of monomers of type dialkylaminoalkyl (meth)acrylamide, diallylamine, methyldiallylamine and their quaternary ammonium salt,
   c. and/or at least one non-ionic monomer selected from the group consisting of N-vinyl acetamide, N-vinyl formamide, N-vinylpyrrolidone and vinyl acetate,
   d. and/or at least one anionic monomer selected from the group consisting of (meth)acrylic acid, acrylamidomethylpropyl sulfonic acid, itaconic acid, maleic anhydride, maleic acid, methallyl sulfonic acid, vinylsulfonique acid, and their salts,
   e. and/or at least one additional polyfunctional compound selected from the group including polyethylenimine, polyamine (primary or secondary), polyallylamine, functional thioether, polyols, epichlorohydrin polyamides (PAE), and polyamine amides (AAP).

18. The method according to claim 1, wherein the (co)polymer base additionally contains at least one polyfunctional compound containing at least 3 heteroatoms selected from N, S, O, and P and with each at least one mobile hydrogen.

19. The method according to claim 1, wherein, in step (a), the pH is adjusted to between 5.5 and 12.

20. A process comprising using the aqueous polymer solution prepared according to claim 1 as a flocculant, retention agent, drainage agent, or agent for dry strength resistance in a paper manufacturing process.

\* \* \* \* \*